(No Model.)

J. E. SINCLAIR.
VALVE FOR PUMPS.

No. 270,853. Patented Jan. 16, 1883.

WITNESSES:
Thos. Houghton.
A. G. Syne.

INVENTOR:
J. E. Sinclair
BY
ATTORNEYS.

UNITED STATES PATENT OFFICE.

JAMES E. SINCLAIR, OF BALTIMORE, MARYLAND.

VALVE FOR PUMPS.

SPECIFICATION forming part of Letters Patent No. 270,853, dated January 16, 1883.

Application filed August 18, 1882. (No model.)

*To all whom it may concern:*

Be it known that I, JAMES E. SINCLAIR, of Baltimore, in the State of Maryland, have invented a new and useful Improvement in Valves for Pumps, of which the following is a full, clear, and exact description, reference being had to the annexed drawings, forming part of this specification.

This invention relates to elastic valves formed in a single piece and provided with a central opening; and the invention consists of an elastic valve, preferably of hemispherical form, having a round orifice of comparatively small diameter, which is adapted to be dilated in size by the pressure of fluid against the concave surface and contracted by pressure against the convex surface of the valve; and the invention also consists in combining with such a valve a metallic hemisphere formed in sections, secured to the outer surface of the valve in such manner that they shall fit close together edge to edge and brace each other under pressure.

Figure 1:
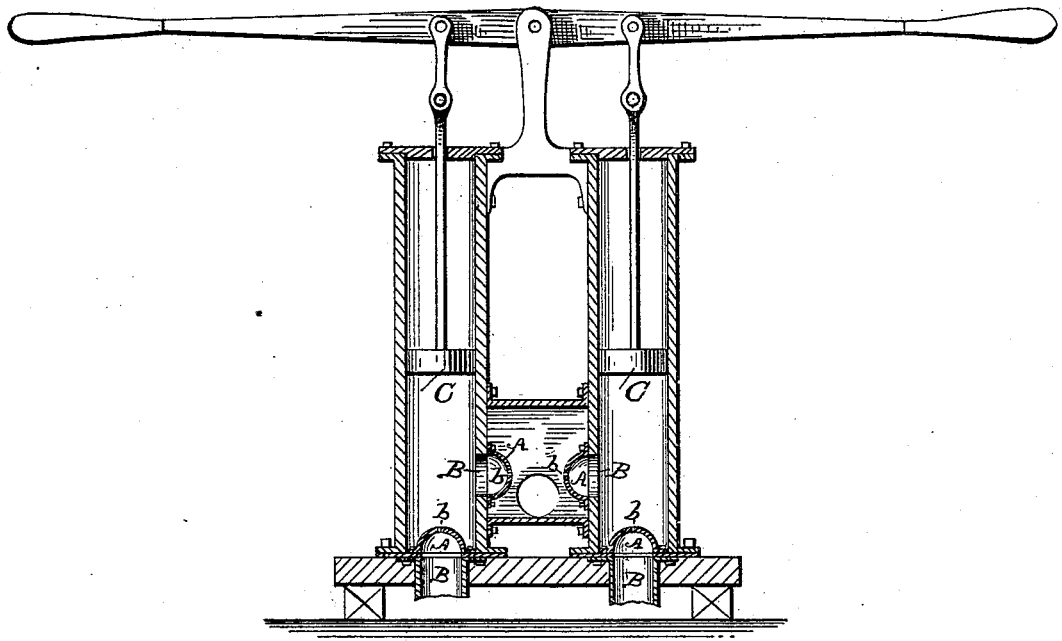
Figure 2:
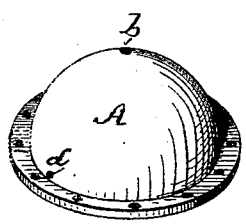
Figure 3:
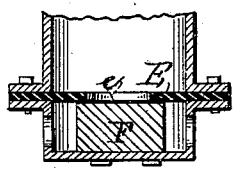
Figure 4:
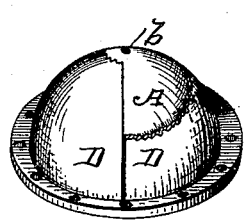

In the drawings, Figure 1 is a sectional elevation of a pump, showing my improved valve. Fig. 2 is a perspective view of the valve. Fig. 3 is a modification of the valve, and Fig. 4 is a perspective view of the hemispherical valve combined with a sectional metallic hemisphere.

Heretofore elastic valves have been formed in one piece, with a slit extending across the crown to form two lips, through which the fluid may be forced. The large mouth thus formed, however, tends to weaken the power of resistance of the valve, and the valve consequently is only adapted for small chambers, or where but little bearing-surface is required. I therefore construct a rubber valve having a round orifice, which is to be dilated in size through the elastic character of the material, to allow the passage of fluid, and which will be contracted and closed by the natural distribution of the pressure upon the fluid resting upon the valve, whereby the texture of the spherical part of the valve shall be preserved as nearly intact as possible, and its power of resistance due to the sphericity shall be utilized to the fullest extent.

The valve A is formed of a hollow hemisphere of rubber, having a small round orifice, *b*, at the center. The valve is secured in place over an inlet or discharge-opening, B, by means of screws, which are passed through its outer rim near the edge, or in any other suitable manner. With this construction, when the piston C is lifted the upward pressure of the fluid will cause the material of the valve to expand, and thus dilate the orifice in size, and when the piston is forced downward the pressure upon the fluid above the valve will force the particles of the material forming the valve closer together, and thus close the orifice; and at the same time the valve will retain its spherical form and be able to resist any ordinary pressure without the need of supports. As a supplemental means, however, of supporting the downward pressure of the fluid by the action of the piston, I also provide a metallic hemisphere, D, formed of any suitable number of sections and placed over the rubber valve, as shown in Fig. 4. The sections are to be secured to the rubber valve in such manner that when the fluid is pressed downward by the piston they will fit close together and brace each other against the pressure.

Instead of making the valve hemispherical in form, it may be made in the form of a disk or square sheet, E, as the case may be, with its edges secured to the walls of the opening, and having a round orifice, *e*, at its center, which rests upon a block, F, as shown in Fig. 3. The block will support the weight of the fluid, while the suction of the piston will lift the valve above the block and allow the fluid to escape upward into the cylinder.

To prevent freezing in winter, the hemispherical valve should be provided with one or more small perforations, *d*, near the edge to allow the water lying around the trough of the valve to escape backward into the well.

Having thus described my invention, what I claim, and desire to secure by Letters Patent, is—

1. A valve having a round orifice therein for the passage of fluid, substantially as shown and described.

2. A hemispherical valve made of elastic material and provided with a round orifice to form a passage for fluid, substantially as shown and described.

3. The combination, with the elastic hollow hemisphere, of the metallic hemisphere, formed in sections and secured to the surface of the former and adapted to fit together edge to edge, and brace each other under pressure, substantially as shown and described.

JAS. E. SINCLAIR.

Witnesses:
  CHAS. I. PARNELL,
  HENRY MIDDONDORF.